United States Patent [19]

Kashiwame et al.

[11] Patent Number: 4,736,000

[45] Date of Patent: Apr. 5, 1988

[54] METHOD FOR CURING AROMATIC POLYTHIOETHER SULFONE

[75] Inventors: Josho Kashiwame, Yamato; Shigeyuki Kozawa, Yokohama; Takao Doi, Yokohama; Nobuyuki Tamai, Yokohama, all of Japan

[73] Assignee: Asahi Glass Company Ltd., Tokyo, Japan

[21] Appl. No.: 938,465

[22] Filed: Dec. 5, 1986

[30] Foreign Application Priority Data

Dec. 6, 1985 [JP] Japan ................. 60-273430
Dec. 20, 1985 [JP] Japan ................. 60-285708
Dec. 20, 1985 [JP] Japan ................. 60-285709
Mar. 25, 1986 [JP] Japan ................. 61-64938
Mar. 25, 1986 [JP] Japan ................. 61-64939

[51] Int. Cl.$^4$ .................... C08L 61/20; C08L 63/00
[52] U.S. Cl. ........................... 525/509; 525/511; 525/513; 525/519

[58] Field of Search ............... 525/509, 523, 519, 535, 525/505, 537, 513, 511; 524/542, 609

[56] References Cited

U.S. PATENT DOCUMENTS 3,819,582  6/1974  Feasey ........................... 525/535
4,340,697  7/1982  Aya et al. ...................... 525/420
4,654,410  3/1987  Kashiwame et al. ........... 528/171

Primary Examiner—Theodore E. Pertilla
Attorney, Agent, or Firm—Oblon, Fisher, Spivak, McClelland & Maier

[57] ABSTRACT

A method for curing an aromatic polythioether sulfone, which comprises mixing an aromatic polythioether sulfone polymer with a member selected from the group consisting of (a) a compound having at least two epoxy, isocyanate or maleimide groups per molecule, (b) an aminoplast resin, (c) a metal chelate compound of acetylacetone, and (d) a halide of a metal belonging to Group VIII or IB of the Periodic Table, followed by heat treatment.

9 Claims, No Drawings

METHOD FOR CURING AROMATIC POLYTHIOETHER SULFONE

The present invention relates to a method for curing an aromatic polythioether sulfone.

Aromatic polysulfones are well known, and disclosed, for instance, by R. N. Johnson et al. in J. Polym. Sci., A-1 5 2375 (1967). Such aromatic polysulfones are thermoplastic resins having excellent mechanical properties at high temperatures and good chemical resistance and electric characteristics, and some of them are being practically used for electric or electronic parts, aircraft parts, automobile parts, food processing machine parts, parts of medical appliances, etc.

On the other hand, aromatic polythioether sulfones are disclosed, for example, in Japanese Unexamined Patent Publication No. 13347/1972 and Japanese Examined Patent Publications No. 25879/1978 and No. 25880/1978, and known to be thermoplastic resins having excellent mechanical properties at high temperatures.

Further, aromatic polysulfone/polythioethersulfone copolymers are thermoplastic resins having excellent mechanical properties at high temperatures, which can be produced by the processes disclosed by the present inventors in Japanese unexamined patent publication Nos. 72020/1986, 76523/1986 and 168629/1986.

The above polymers are all excellent in the mechanical properties. However, they are thermoplastic resins, and have a problem that they deform when heated at a temperature of higher than the glass transition temperature (Tg), and they are inferior in the heat resistance when used at high temperatures. Accordingly, in the applications to the fields where the use at high temperatures is unavoidable, polyether ketone or polyimide resins are used. However, these resins are considerably expensive, and are not suitable for use as resins for general purposes.

The present inventors have conducted various studies and reserach for improving the heat resistance of the aromatic polythioether sulfones to overcome the above-mentioned problems. As a result, it has been found that when an aromatic polythioether sulfone polymer, particularly an aromatic polythioether sulfone polymer containing sulfur in the main chain, is heat-treated in the presence of a certain specific compound, the curing can be facilitated and it is possible to obtain a cured product having excellent heat resistance. It has been found also that such a cure-facilitating effect can be observed in several kinds of compounds. The present invention has been accomplished on the basis of these discoveries.

The present invention provides a method for curing an aromatic polythioether sulfone, which comprises mixing an aromatic polythioether sulfone polymer with a member selected from the group consisting of (a) a compound having at least two epoxy, isocyanate or maleimide groups per molecule, (b) an aminoplast resin, (c) a metal chelate compound of acetylacetone, and (d) a halide of a metal belonging to Group VIII or IB of the Periodic Table, followed by heat treatment.

Now, the present invention will be discribed in detail with reference to the preferred embodiments.

The aromatic polythioether sulfone of the present invention is an aromatic polythioether sulfone polymer having the formula:

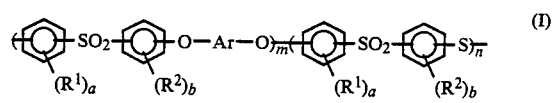

wherein Ar is a bivalent aromatic residue selected from the group consisting of:

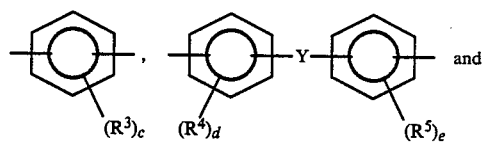

wherein each of $R^1$ to $R^7$ which may be the same or different, is hydrogen or a hydrocarbon group having from 1 to 8 carbon atoms, each of a to e which may be the same or different, is an integer of from 0 to 4, each of f and g which may be the same or different, is an integer of from 0 to 3, Y is a single bond,

wherein R is hydrogen or a hydrocarbon group having from 1 to 6 carbon atoms, and m and n satisfy $0 \leq m/m+ < 1$, provided when m=0, the polymer is a polythioether sulfone homopolymer.

In the aromatic polythioether sulfone polymer of the formula I of the present invention, the raio of m:n=1:20 to 20:1, where each of m and n indicates the degree of polymerization in the formula I. In view of the properties and the moldability of the polymer, m:n is preferably from 1:10 to 15:1, more preferably from 1:4 to 10:1. The degree of polymerization as the aromatic polythioether sulfone polymer is such that the inherent viscosity $\eta_{inh}$ is from 0.1 to 1.5, preferably from 0.1 to 1.3, more preferably from 0.1 to 1.0 as measured at 30° C. with respect to its solution having a concentration of 0.5 g/dl in a solvent mixture of phenol/1,1,2,2-tetrachloroethane (3/2 by weight ratio).

The curing method of the present invention comprises heat-treating the above aromatic polythioether sulfone polymer in the presence of a member selected from the group consisting of the above members (a) to (d). Now, the compounds belonging to members (a) to (d) will be described in detail.

Firstly, referring to member (a) i.e. a compound having at least to epoxy, isocyanante or maleimide groups per molecule, the compound having epoxy groups may be liquid or solid. For example, there may be mentioned glycidyl ethers of bisphenol A, resorcinol, hydroquinone, pyrocatechol, bisphenol F, bisphenol S, bisphenol AF, 1,3,5-hydroxybenzene, trihydroxy-diphenyldimethylmethane, 4,4'-dihydroxybiphenyl, 1,1,2,2-tetrakis(4-hydroxyphenyl)ethane, etc., and halogenated glycidyl ethers thereof; glycidyl epoxy resins of glycidyl ether type such as glycidyl ethers of butanediol, glycerol, etc., of glycidyl ester type such as phthalic acid glycidyl ester, etc., and of glycidyl-amine type such as aniline, diaminobenzene, benzidine, methylene dianiline, diaminocyclohexane, isocyanuric acid, aminocyclohexane, diaminodiphenyl sulfone, diaminonaphthalene, xylenediamine, cyclohexanebismethyl-amine, melamine, etc.; non-glycidyl epoxy resins of linear type such as epoxidized olefins, epoxidized soybean oil, etc., and of cyclic type such as vinylcyclohexenedioxide, dicylopentadienedioxide, etc.; and novolak type epoxy resins and halides thereof.

Likewise, referring to member (a), the compound having isocyanate groups may be aliphatic or aromatic.

As aliphatic isocyanate compounds, there may be mentioned, for example, hexamethylene diisocyanate, isophorone diisocyanate, hydrogenated diphenylmethane diisocyanate, xylylene diisocyanate, hydrogenated xylynene diisocyanate, trans-cyclohexane-1,4-diisocyanate, 2,2,4-trimethylhexamethylene diisocyanate, tetramethylxylene diisocyanate, 2,6-diisocyanato methyl caproate, dimer acid diisocyanate, 1,8-diisocyanato-4-isocyanato methyloctane, hydrogenated tolylene diisocyanate, lysine triisocyanate, isopropylidenedicyclohexyl diisocyanate and their isocyanurate or trimethylolpropane derivatives.

As the aromatic isocyanate compounds, there may be mentioned, for example, tolylene diisocyanate, diphenylmethane diisocyante, 1,5-naphthalene diisocyanate, phenylene diisocyanate, 3,3'-dimethyl-4,4'-diphenylene diisocyanate, triphenylene methane triisocyanate, 4,4'-diisocyanatodiphenyl ether and their isocyanurate or trimethylolpropane derivatives.

The above epoxy or isocyanate compound is added to the aromatic polythioether sulfone polymer in an amount of from 0.5 to 50 parts by weight, pereferably from 1 to 20 parts by weight, relative to 100 parts by weight of the aromatic polythioether sulfone polymer. If the amount is less than this range, the curing will be inadequate. On the other hand, if the amount exceeds the range, an unreacted epoxy or isocyanate compound will remain, such being undesirable. Two or more epoxy or isocyanate compounds may be used in combination, respectively, within a suitable range.

In member (a), the compound having at least two maleimide groups per molecule may usually be a polyfunctional maleimide compound obtainable from a polyamino compound and maleic anhydride by dehydration. The polyamino compound may be aliphatic or aromatic. However, from the viewpoint of the heat resistance, a maleimide compound obtained from an aromatic polyamino compound is preferred.

As such a polyfunctional maleimide compound, there may be mentioned, for instance, p-phenylenebismaleimide, m-phenylenebismaleimide, 4,4'-diphenylmethanebismaleimide, 4,4'-diphenyletherbismaleimide, 4,4'-diphenylsulfonebismaleimide, 4,4'-diphenylsulfidebismaleimide, 4,4'-diphenylbismaleimide, 3,3'-dimethyl-4,4'-diphenylbismaleimide and a polyfunctional maleimide represented by the formula:

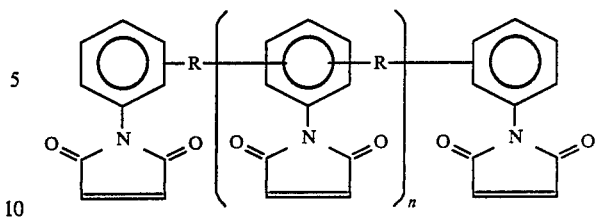

wherein R is an alkylene group having from 1 to 8 carbon atoms and n is a number of from 0.1 to about 2. These compouds may be used along or in combination. The mixing ratio of the aromatic polythioether sulfone polymer to the polyfunctional maleimide compound may be varied depending upon the desired physical properties of the cured product, and is usually preferably within a range of from 100:1 to 1:10 by weight ratio. In general, when the weight ratio of the aromatic polythioether sulfone polymer is large, the cured product will be raltively soft. On the other hand, if the weight ratio is small, the cured product will be hard. Even if the polyfunctional maleimide compound having a low molecule weight is cured by itself, the product will be inferior in the mechanical properties. The properties can be improved by the incorporation of the aromatic polythioether sulfone polymer.

In the present invention, the aminoplast resin as mmber (b) to be mixed to the aromatic polythioether sulfone polymer, is a condensation product of an aldehyde with melamine, urea, guanamine or the like, or with an aliphatic or aromatic polyamino compound.

here, the aliphatic polyamino compound includes ethylenediamine, trimethylenediamine, tetramethylenediamine, 1,2-diaminopropylenediamine, 1,4-diaminocyclohexane and 1,4-diaminocyclohexylmethane.

The aromatic polyamino compound includes, for example, p-phenylenediamine, m-phenylenediamine, o-phenylenediamine, 2,4-tolylenediamine, p-aminobenzylamine, p-xylenediamine, m-xylenediamine, benzidien, 4,4'-diaminodiphenylmethane, 4,4'-diaminodiphenylether, 4,4'-diaminodiphenylsulfone and 4,4'-diaminodiphenylsulfide.

Among them, compounds obtained by reacting melamine, urea or benzoguanamine with formaldehyde, may be most well known and most preferably be used.

As the aldehyde to be used for this purpose, there may be mentioned, in addition to formaldehyde, acetaldehyde, crotonaldehyde, acrolein, benzaldehyde and furfural, whereby similar condensation products can be obtained.

The above amine-aldehyde condensation products may contain alkylol groups such as methylol. In most cases, at least a part thereof may be etherified by a reaction with an alcohol, whereby a resin soluble in an organic solvent can be obtained. For this purpose, methanol, ethanol, propanol, butanol, pentanol, hexanol, other monohydric alcohols, an aromatic alcohol such as benzyl alcohol, an alicyclic alcohol such as cyclohexanol, a monoether of glycol such as cellosolve, a halogen-substituted alcohol such as 3-chloropropanol, and other substituted alcohols, may be employed.

Among these ethers, amine-aldehyde resins etherified with methanol or butanol, may preferably be employed.

Such an aminoplast resin is added in an amount of from 0.5 to 50 parts by weight, preferably from 1 to 20 parts by weight, to 100 parts by weight of the aromatic polythioether sulfone polymer. If the amount is less than this range, the curing will be inadequate. On the other hand, if the amount exceeds this range, an unreacted aminioplast resin will remain, whereby the mechanical or thermal properties tend to deteriorate, such being undesirable. These aminoplast resins may be used in combination within suitable ranges of the respective amounts. As the metal chelate compounds of acetylacetone for member (c), acetylacetonates of (1) Group IA, (2) Group IIA, (3) Group IIB, (4) Group IVB, (5) Group VB, (6) Group VIB, (7) Group VIIB, (8) Group VIII, (9) Group IB, (10) Group IIB, (11) Group IIIA, and (12) lanthanide group of the Periodic Table may suitably be employed.

Specific acetylacetonates (hereinafter referred to simply as "acac") will be given below.

(1) Group IA acac includes Cs(I) acac, (2) Group IIA acac includes Mg(II), Ca(II) and Sr(II) acac, (3) Group IIIB acac includes La(III) acac, (4) Group IVB acac includes [Ti(III) acac]$_2$, TiCl$_6$, Zr(IV) and ZrO(II) acac, (5) Group VB acac includes V(III) acac, (6) Group VIB acac includes Cr(III) and Mo(III) acac, (7) Group VIIB acac includes Mn(II), Mn(III) and Re(III) acac, (8) Group VIII acac includes Fe(III), Co(II), Co(III), Rh(III) and Ni(II) acac, (9) Group IB acac includes Cu(II) acac, (10) Group IIB acac includes Zn(II) and Cd(II) acac, (11) Group IIA acac includes Al(III), In(II) and Cl(I) acac, (12) lanthanide group acac includes Ce(III), Sm(III), Cd(III), Er(III), Tm(III) and Lu(III) acac.

Particularly preferred are acetylacetonates of Cu(II), Mn(II), Mn(III), Fe(III), Co(II), Ni(II), Al(III) and Zn(II).

Such a metal chelate compound of acethylacetone is added in an amount of from 0.1 to 20 parts by weight, preferably from 0.5 to 10 parts by weight to 100 parts by weight of the aromatic polythioether sulfone polymer. If the amount is less than this range, the curing will be inadequate. On the other hand, if the amount exceeds this range, the mechanical properties or electrical properties of the cured product tend to deteriorate, such being undesirable. These compounds may be used in combination within suitable ranges of the respective amounts.

As the halide of a metal belonging to Group VIII or IB of the Periodic Table for member (d), chlorides, iodides or fluorides of the respective metals may suitably be employed.

Now, specific examples of Group VIII metal halides will be given.

(1) Metal chlorides include FeCl$_2$, FeCl$_3$, CoCl$_2$, NiCl$_2$, RuCl$_3$, RuCl$_4$, RhCl$_3$, PdCl$_2$, OsCl$_3$, InCl$_3$, InCl$_4$, PtCl$_2$ and PtCl$_4$.

(2) Metal iodides include FeI$_2$, CoI$_2$, NiI$_2$, RuI$_2$, RuI$_3$, RhI$_3$, PdI$_2$, OsI$_4$, InI, InI$_3$, PtI$_2$ and PtI$_4$.

(3) Metal fluorides include FeF$_2$, FeF$_3$, CoF$_2$, CoF$_3$, NiF$_2$, RhF$_5$, RhF$_3$, PdF$_2$, PdF$_3$, OsF$_4$, OsF$_8$ and InF$_3$. Likewise, specific examples of Group IB metal halides will be given.

(4) CuCl, CuCl$_2$, CuI, CuF, CuF$_2$, AgCl, AgI, AgF, AgF$_2$, AuCl, AuCl$_2$, AuI and AuI$_3$.

The above-mentioned metal halides may be used whether they are anhydrides or hydrates. Particularly preferred among such metal halides from the viewpoint of stability, costs and cure-promoting effects, are FeCl$_3$ (ferric chloride) and CuCl$_2$ (cupric chloride).

Such a metal halide is added in an amount of from 0.1 to 20 parts by weight, preferably from 0.5 to 10 parts by weight, to 100 parts by weight of the aromatic polythioether sulfone polymer. If the amount is less than this range, the curing will be inadequate. On the other hand, if the amount exceeds this range, the mechanical properties or electrical properties of the cured product tend to deteriorate, such being undesirable. These compounds may be used in combination within suitable ranges of the respective amounts.

The mixing of the aromatic polythioether sulfone polymer with a member selected from (a) to (d) may be conducted by a usual method so long as uniform mixing can be done. For instance, there may be mentioned a method wherein the two components are mixed in a solvent which is capable of dissolving only the members (a) to (d), and then the solvent is removed or a method in which the two components are mixed in a solvent which is capable of dissolving both of them, and then the solvent is removed. In the case of the compound having maleimide groups in member (a), when it is mixed in a molten state, it is possible to obtain a molded product directly. Further, it is possible that a solution of the mixture is poured into a poor solvent to obtain a solid.

In the present invention, the curing temperature in the heat treatment is usually from 150° to 400° C., preferably at least the glass transition temperature (Tg) of the polymer and not higher than 350° C. If the temperature is lower than this range, the curing tends to be slow. On the other hand, if the temperature is higher than this range, a decomposition reaction is likely to take place, such being undesirable.

The curing time varies depending upon the temperature. Usually, a curing time of from 5 minutes to 10 hours is sufficient for the curing.

In the case of mixing with maleimide compounds, for the purpose of lowering the curing temperature or shortening the curing time, it is possible to employ a usual curing catalyst such as a tertiary amine or a peroxide.

According to the curing method of the present invention, the cross linking reaction is promoted by the curing reaction due to the heat treatment. As a result, the cured product of the aromatic polythioether sulfone thereby obtained, shows superior heat resistance to a non-cured product not subjected to such a curing reaction. For instance, such a cured product is practically adequately durable under a soldering condition (240°-260° C., 10 seconds) and yet has good chemical resistance and water resistance, and it is useful in the form of a laminated product, a film or a sheet for machine parts, automobile parts, electric or electronic parts, food processing machine parts, etc.

Now, the present invention will be described in further detail with reference to Examples. However, it should be understood that the present invention is by no means restricted by these specific Examples.

EXAMPLE 1

2.5 g of a copolymer of the formula:

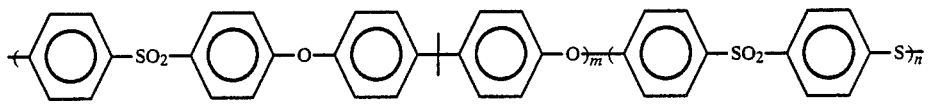

[wherein m/n=1/1, $\eta_{inh}$=0.4 (as measured in phenol/1,1,2,2-tetrachloroethane=3/2 by weight ratio at 30° C. at a concentration of 0.5 g/dl)] as the aromatic polythioether sulfone polymer and 0.25 g of a novolak-type epoxy resin, were dissolved in 10 g of m-cresol, and the solution was cast on a glass substrate, and dried in air, then at 100° C. for 1 hour, and at 200° C. for 1 hour, to remove the solvent. Then, a curing reaction was conducted at 280° C. for 2 hours to obtain a cured film. This film was insoluble in a polar solvent such as m-cresol or N-methyl-2-pyrrolidone (NMP), and infusible even at a temperature of 300° C. When this film was immersed in m-cresol at room temperature for 15 minutes, the degree of swelling (representing the cross linked degree) was 100%. Further, when immersed in the soldering bath for 30 seconds, the temperature (Th) at which no deformation was observed, was 240° C.

EXAMPLES 2 to 4

Cured films were obtained by conducting a curing reaction in the same manner as in Example 1 except that the epoxy compounds identified in Table 1 were used instead of the novolak type epoxy resin used in Example 1. The properties of these films were measured in the same manner as in Example 1. The results are shown in Table 1.

EXAMPLES 5 to 10

Cured films were obtained by conducting a curing reaction in the same manner as in Example 1 except that the copolymers or polymers and the epoxy compounds identified in Table 1 were used instead of the copolymer and the epoxy resin used in Example 1. The properties of these films were measured in the same manner as in Example 1. The results are shown in Table 1.

TABLE 1

| Example | Copolymer or polymer | Epoxy compound | Th (°C.) | Degree of swelling (%) in m-cresol |
|---|---|---|---|---|
| 2 | ⟵SO₂–⟨⟩–⟨⟩–O–⟨⟩–C(CH₃)₂–⟨⟩–O⟩ₘ–⟨⟩–SO₂–⟨⟩–S⟩ₙ (m/n = 1/1, η inh = 0.40) | 2.5 g N,N,N',N'—tetraglycidyldiaminodiphenylmethane 0.25 g | 240 | 90 |
| 3 | Same as Example 2 | N,N,N',N'—tetraglycidyl-m-xylylenediamine 0.25 g | 240 | 95 |
| 4 | Same as Example 2 | Bisphenol A diglycidylether 0.25 g | 240 | 195 |
| 5 | Same as Example 2 (m/n = 1/2, η inh = 0.45) | Novolak type epoxy resin 0.25 g | 250 | 53 |
| 6 | ⟵SO₂–⟨⟩–⟨⟩–O–⟨⟩–⟨⟩–O⟩ₘ–⟨⟩–SO₂–⟨⟩–S⟩ₙ (m/n = 1/1, η inh = 0.58) | 2.5 g Same as Example 5 0.25 g | 260 | 12 |
| 7 | ⟵SO₂–⟨⟩–⟨⟩–O–⟨⟩–⟨⟩–O⟩ₘ (m/n = 1/1, η inh = 0.82) | 2.5 g Same as Example 5 0.25 g | 260 | 5 |
| 8 | ⟵SO₂–⟨⟩–⟨⟩–O–⟨⟩–⟨⟩–O⟩ₘ–⟨⟩–SO₂–⟨⟩–S⟩ₙ (m/n = 10/1, η inh = 0.43) | 2.5 g N,N,N',N'—tetraglycidylcyclohexane-1,3-bismethylamine 0.25 g | 240 | 155 |
| 9 | Same as Example 8 | 2.5 g Same as Example 8 0.125 g | 230 | 180 |
| 10 | ⟵SO₂–⟨⟩–⟨⟩–SO–⟨⟩–S⟩ₙ | 2.5 g Novolak type epoxy resin 0.25 g | 240 | 50 |

EXAMPLE 11

2.5 g of the same copolymer as used in Example 1 as the aromatic polythioether sulfone polymer and 0.39 g of an isocyanurate derivative of tolylenediisocyanate ("Colonate 2030", trademark, manufactured by Nippon Polyuretane Company, solid content: 50%), was dissolved in 15 g of 1,1,2,2-tetrachloroethane, and the solution was cast on a glass substrate, and dried at 100° C. for 1 hour and at 170° C. for 1 hour to remove the solvent. Then, a curing reaction was conducted at 280° C. for 1 hour to obtain a cured film. This film was insoluble in a polar solvent such as m-cresol or N-methyl-2-pyrrolidone, and infusible even at a temperature of 300° C. The degree of swelling and Th of this film were measured in the same manner as in Example 1. The results are shown in Table 2.

EXAMPLES 12 to 16

Cured films were obtained by conducting a curing reaction in the same manner as in Example 11 except that the copolymer and the isocyanate compound in Example 11 were changed to the copolymers and the isocyanate compounds identified in Table 2. The properties of the films thus obtained, were measured in the same manner as in Example 11. The results are shown in Table 2.

EXAMPLE 17

10 g of a copolymer of the formula:

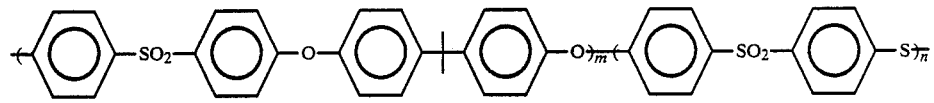

[wherein $m/n=1/1$, $\eta_{ing}=0.59$ (as measured in phenol/1,1,2,2'-tetrachloroethane=3/2 by weight ratio at 30° C. at a concentration of 0.5 g/dl)] as the aromatic polythioether sulfone polymer and 1 g of 4,4'-bis-maleimidediphenylmethane, were dissolved in 40 g of NMP, and the solution was cast on a glass substrate, and dried at 100° C. for 2 hours and at 170° C. for 2 hours to remove the solvent and obtain a film. This film was subjected to a curing reaction at 320° C. for 1 hour to obtain a cured film.

With respect to this film, the tensile strength, the glass transition temperature and the degree of swelling when immersed in NMP at room temperature for 15 minutes, were measured. The results are shown in Table 3.

EXAMPLES 18 to 24

Cured films were obtained by conducting a curing reaction in the same manner as in Example 17 except that the copolymer and 4,4'-bismaleimidediphenylmethane in Example 17 were changed to the copolymers and the bismaleimide compounds identified in Table 3. The properties of these films were measured in the same manner as in Example 17. The results are shown in Table 3.

TABLE 2

| Example | Copolymer | Isocyanate compound | Th (°C.) | Degree of swelling (%) in m-cresol |
|---|---|---|---|---|
| 11 | [structure with CH₃/C/CH₃ group] ($m/n = 1/1$, $\eta_{inh} = 0.40$) 2.5 g | Isocyanurate derivative of tolylene diiscyanate 0.39 g | 240 | 70 |
| 12 | Same as Example 11 ($m/n = 10/1$, $\eta_{inh} = 0.45$) | Same as Example 11 | 230 | 160 |
| 13 | [structure] ($m/n = 1/1$, $\eta_{inh} = 0.56$) 2.5 g | Same as Example 11 | 260 | 6 |
| 14 | Same as Example 13 | Isocyanate derivative of hexamethylene diisocyanate ("Colonate EH" manufactured by Nippon Urethane Co., solid content: 100%) | 260 | 2 |
| 15 | Same as Example 13 | Trimethylolpropane derivative of hexamethylene diisocyanate ("Barnock DN 980" manufactured by Dainippon Ink K.K., solid content: 76%) | 250 | 17 |
| 16 | [structure] ($m/n = 1/1$, $\eta_{inh} = 0.45$) 2.5 g | Same as Example 11 | 240 | 35 |

TABLE 3

| Example | Copolymer | Bismaleimide compound | Tensile strength (kg/cm$^2$) | Glass transition temperature | Degree of swelling (%) in NMP |
|---|---|---|---|---|---|
| 17 | ![structure with SO$_2$, O, C(CH$_3$)$_2$, SO$_2$, S]<br>(m/n = 1/1, η inh = 0.59) | 4,4'-Bismaleimidephenylmethane 10 g | 848 | 210 | 5.3 |
| 18 | Same as Example 17 | Same as Example 17 2 g | 857 | 214 | 3.2 |
| 19 | Same as Example 17 | Same as Example 17 4 g | 843 | 223 | 1.4 |
| 20 | ![structure with SO$_2$, O, O, SO$_2$, S]<br>(m/n = 1/1, η inh = 0.58) | Same as Example 17 1 g | 874 | 230 | 2.1 |
| 21 | Same as Example 20 | Same as Example 17 2 g | 863 | 242 | 0.8 |
| 22 | Same as Example 20 | Same as Example 17 4 g | 891 | 251 | 0.3 |
| 23 | Same as Example 20 | "Maleimide M-20" manufactured by Mitsui Toatsu Kagaku Co., 4 g | 857 | 252 | 0.2 |
| 24 | Same as Example 20 | 1,4-Bismaleimidebenzene 4 g | 845 | 253 | 0.2 |

EXAMPLE 25

4 g of a copolymer of the formula:

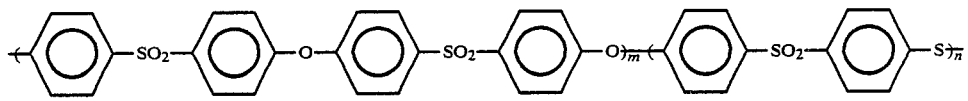

[wherein m/n = 10/1, $\eta_{inh}$=0.43 (as measured in phenol/1,1,2,2-tetrachloroethane=3/2 by weight ratio at 30° C. at a concentration of 0.5 g/dl)] as the aromatic polythioether sulfone polymer and 6 g of 4,4'-bis-maleimidediphenylmethane, were dissolved in methylene chloride, and methylene chloride was evaporated under reduced pressure to dryness. The composition thus obtained was pulverized, and then pressed by a press molding machine at 180° C. under 50 kg/cm² for 1 hour to obtain a molded plate having a thickness of 2 mm. This molded plate was cured at 250° C. for 10 hours.

The glass transition temperature of this molded plate was measured in the same manner as in Example 17. Further, the flexural strength and impact strength were measured in accordance with JIS K6911. The results are shown in Table 4.

EXAMPLES 26 to 29

Molded plates were prepared in the same manner as in Example 25 except that the copolymer and 4,4'-bis-maleimidediphenylmethane in Example 25 were changed to those identified in Table 4.

The physical properties of these molded plates were measured in the same manner as in Example 25. The results are shown in Table 4.

TABLE 4

| Example | Copolymer | Bis-maleimide compound | Glass transition temperature (°C.) | Flexural strength (kg/cm²) | Impact strength (kg.cm/cm) |
|---|---|---|---|---|---|
| 25 | (copolymer structure shown) (m/n = 10/1, $\eta_{inh}$ = 0.43) | 4,4'-Bis-maleimide-diphenyl-methane 6 g | 240 | 940 | 4.5 |
| 26 | Same as Example 25  3 g | Same as Example 25 7 g | 242 | 730 | 3.9 |
| 27 | Same as Example 25  2 g | Same as Example 25 8 g | 245 | 590 | 3.5 |
| 28 | (copolymer structure shown) (m/n = 1/1, $\eta_{inh}$ = 0.15)  7 g | Same as Example 25 3 g | 223 | 420 | 2.4 |
| 29 | Same as Example 28  5 g | Same as Example 25 5 g | 225 | 370 | 2.1 |

EXAMPLE 30

2.5 g of the same copolymer as used in Example 1 as the aromatic polythioether sulfone polymer and 0.25 g of hexamethoxymethylmelamine, were dissolved in 10 g of m-cresol, and the solution was cast on a glass substrate, and dried at 100° C. for 1 hour and at 200° C. for 1 hour to remove the solvent. Then, a curing reaction was conducted at 240° C. for 3 hours to obtain a cured film. This film was insoluble a polar solvent such as m-cresol or N-methyl-2-pyrrolidone, and infusible even at 300° C. The degree of swelling and Th of this film were measured in the same manner as in Example 1. The results are shown in Table 5.

EXAMPLES 31 to 38

Cured films were obtained by conducting a curing reaction in the same manner as in Example 30 except that the copolymer, the aminoplast resin and the curing condition in Example 30 were changed to the copolymers, the aminoplast resins and the curing conditions identified in Table 5. The properties of the films thus obtained were measured in the same manner as in Example 30. The results are shown in Table 5.

TABLE 5

| Example | Copolymer | Aminoplast resin | Curing condition | Th (°C.) | Degree of swelling (%) in m-cresol |
|---|---|---|---|---|---|
| 30 | ⁅⟨C₆H₄⟩-SO₂-⟨C₆H₄⟩-O-⟨C₆H₄⟩-C(CH₃)₂-⟨C₆H₄⟩-O⁆ₘ⁅⟨C₆H₄⟩-SO₂-⟨C₆H₄⟩-S⁆ₙ (m/n = 1/1, η inh = 0.40) | 2.5 g Hexamethoxymethyl-melamine 0.25 g | 240° C. 3 hr | 240 | 105 |
| 31 | Same as Example 30 | Same as Example 30 0.125 g | 280° C. 1 hr | 240 | 65 |
| 32 | Same as Example 30 | Same as Example 30 0.125 g | 320° C. 1 hr | 250 | 40 |
| 33 | Same as Example 30 | Hexamethylolmela-minetrimethylether 0.125 g | 280° C. 1 hr | 230 | 97 |
| 34 | ⁅⟨C₆H₄⟩-SO₂-⟨C₆H₄⟩-O-⟨C₆H₄⟩-C(CH₃)₂-⟨C₆H₄⟩-O⁆ₘ⁅⟨C₆H₄⟩-SO₂-⟨C₆H₄⟩-S⁆ₙ (m/n = 10/1, η inh = 0.54) | 2.5 g Hexamethoxymethyl-melamine 0.125 g | 280° C. 1 hr | 240 | 150 |
| 35 | ⁅⟨C₆H₄⟩-SO₂-⟨C₆H₄⟩-O-⟨C₆H₄⟩-O⁆ₘ⁅⟨C₆H₄⟩-SO₂-⟨C₆H₄⟩-S⁆ₙ (m/n = 1/1, η inh = 0.58) | 2.5 g Tetramethoxymethyl-benzoguanamine 0.125 g | 280° C. 1 hr | 260 | 2 |
| 36 | Same as Example 35 | Tetramethoxymethyl-urea 0.125 g | 280° C. 1 hr | 250 | 37 |
| 37 | ⁅⟨C₆H₄⟩-SO₂-⟨C₆H₄⟩-O-⟨C₆H₄⟩-O⁆ₘ⁅⟨C₆H₄⟩-SO₂-⟨C₆H₄⟩-S⁆ₙ (m/n = 1/1, η inh = 0.48) | 2.5 g Hexamethoxymethyl-melamine 0.125 g | 280° C. 1 hr | 260 | 6 |
| 38 | ⁅⟨C₆H₄⟩-SO₂-⟨C₆H₄⟩-O⁆ₘ⁅⟨C₆H₄⟩-SO₂-⟨C₆H₄⟩-S⁆ₙ (m/n = 1/1, η inh = 0.43) | 2.5 g Same as Example 37 | 280° C. 1 hr | 240 | 64 |

EXAMPLE 39

TABLE 6

| Example | Copolymer | Metal chelate compound of acetylacetone | Curing condition | Th (°C.) | Degree of swelling (%) in m-cresol |
|---|---|---|---|---|---|
| 39 | ![structure] +⟨O⟩—SO₂—⟨O⟩—O—⟨O⟩—C(CH₃)₂—⟨O⟩—O)ₘ(⟨O⟩—SO₂—⟨O⟩—S)ₙ  2.5 g (m/n = 1/1, ηinh = 0.40) | Cu(acac)₂ 0.025 g | 240° C. 3 hr | 240 | 85 |
| 40 | Same as Example 39 | Fe(acac)₃ 0.025 g | 240° C. 3 hr | 240 | 70 |
| 41 | Same as Example 39 | Mn(acac)₃ 0.025 g | Same as Example 40 | 230 | 125 |
| 42 | Same as Example 39 | Co(acac)₂ 0.025 g | Same as Example 40 | 230 | 150 |
| 43 | +⟨O⟩—SO₂—⟨O⟩—O—⟨O⟩—C(CH₃)₂—⟨O⟩—O)ₘ(⟨O⟩—SO₂—⟨O⟩—S)ₙ  2.5 g (m/n = 10/1, ηinh = 0.54) | Cu(acac)₂ 0.05 g | Same as Example 40 | 230 | 95 |
| 44 | +⟨O⟩—SO₂—⟨O⟩—O—⟨O⟩—⟨O⟩—O)ₘ(⟨O⟩—SO₂—⟨O⟩—S)ₙ  2.5 g (m/n = 1/1, ηinh = 0.58) | Same as Example 43 0.025 g | Same as Example 40 | 260 | 20 |
| 45 | +⟨O⟩—SO₂—⟨O⟩—O—⟨O⟩—SO₂—⟨O⟩—O)ₘ(⟨O⟩—SO₂—⟨O⟩—S)ₙ  2.5 g (m/n = 1/1, ηinh = 0.46) | Same as Example 43 | Same as Example 40 | 260 | 30 |
| 46 | Same as Example 45 | Same as Example 43 | 260° C. 3 hr | 260 | 5 |

2.5 g of the same copolymer as used in Example 1 as the aromatic polythioether sulfone polymer and 0.025 g of Cu(acac)₂, were dissolved in 10 g of m-cresol, and the solution was cast on a glass substrate, and dried at 100° C. for 1 hour and at 200° C. for 1 hour to remove the solvent. Then, a curing reaction was conducted at 240° C. for 3 hours to obtain a cured film. This film was insoluble a polar solvent such as m-cresol or N-methyl-2-pyrrolidone, and infusible even at 300° C. The degree of swelling and Th of this film were measured in the same manner as in Example 1. The results are shown in Table 6.

EXAMPLES 40 to 46

Cured films were obtained by conducting a curing reaction in the same manner as in Example 39 except that the copolymer, the metal chelate compound of acetylacetone and the curing condition in Example 39 were changed to the copolymers, the metal chelate compounds of acetylacetone and the curing conditions identified in Table 6. The properties of the films thus obtained were measured in the same manner as in Example 1. The results are shown in Table 6.

EXAMPLE 47

2.5 g of a copolymer of the formula:

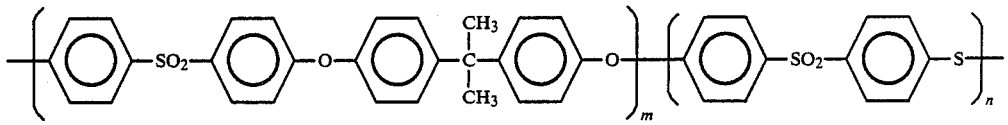

[wherein m/n=10/1, $\eta_{inh}$=0.45 (as measured in phenol/1,1,2,2-tetrachloroethane=3/2 by weight ratio at 30° C. at a concentration of 0.5 g/dl);] as the aromatic polythioether sulfone polymer and 0.025 g of FeCl₃, were dissolved in 15 g of 1,1,2,2-tetrachloroethane and the solution was cast on a glass substrate, and dried at 100° C. for 1 hour and at 170° C. for 1 hour to remove the solvent. Then, a curing reaction was conducted at 240° C. for 5 hours to obtain a cured film. This film was insoluble a polar solvent such as m-cresol or N-methyl-2-pyrrolidone, and infusible even at 300° C. The degree of swelling and Th of this film were measured in the same manner as in Example 1. The results are shown in Table 7.

EXAMPLES 48 to 52

Cured films were obtained by conducting a curing reaction in the same manner as in Example 47 except that the copolymer, the metal halide and the curing condition in Example 47 were changed as identified in Table 7. The properties of the films thus obtained were measured in the same manner as in Example 1. The results are shown in Table 7.

preceding Examples except that a compound selected from members (a) to (d) was not mixed to the aromatic polythioether sulfone polymer or the polymer mixed with the commercially available polymers identified in Tables 8 and 9. The properties of these films or molded plates were measured in the same manner as in Example 1 or Examples 17 and 25. The results are shown in Tables 8 and 9.

TABLE 7

| Example | Copolymer | Metal halide | Curing condition | Th (°C.) | Degree of swelling (%) in m-cresol |
|---|---|---|---|---|---|
| 47 | 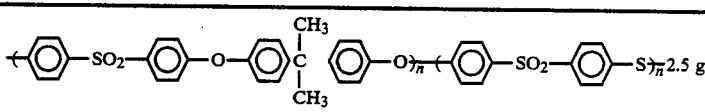 (m/n = 10/1, ηinh = 0.45) | FeCl$_3$ 0.025 g | 240° C. 5 hr | 230 | 105 |
| 48 | 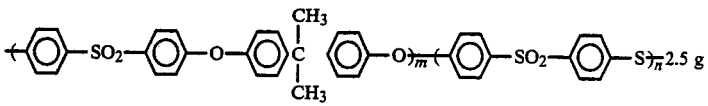 (m/n = 1/1, ηinh = 0.40) | FeCl$_3$ 0.025 g | Same as Example 47 | 240 | 75 |
| 49 | Same as Example 48 | CuCl$_2$ 0.025 g | Same as Example 47 | 240 | 80 |
| 50 | 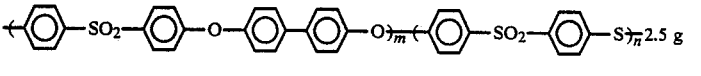 (m/n = 1/1, ηinh = 0.56) | FeCl$_3$ 0.025 g | Same as Example 47 | 240 | 35 |
| 51 | Same as Example 50 | Same as Example 50 | 260° C. 5 hr | 260 | 7 |
| 52 | 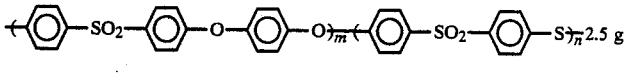 (m/n = 1/1, ηinh = 0.45) | Same as Example 50 | Same as Example 51 | 250 | 15 |

COMPARATIVE EXAMPLES 1 to 15

Cured films or molded plates were obtained by conducting a curing reaction in the same manner as the

TABLE 8

| Comparative Example | Copolymer or polymer | Compound of (a) to (d) | Curing condition | Th (°C.) | Degree of swelling (%) in m-cresol | Glass transition temperature (°C.) | Tensile strength (kg/cm²) |
|---|---|---|---|---|---|---|---|
| 1 | 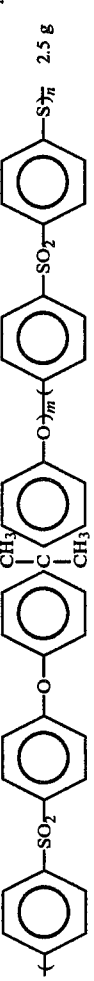 2.5 g (m/n = 1/1, $\eta_{inh}$ = 0.40) | None | 260° C. 3 hr | 200 | Dissolved | — | — |
| 2 | Same as Comparative Example 1 (m/n = 10/1, $\eta_{inh}$ = 0.45) | 2.5 g None | 240° C. 5 hr | 200 | Dissolved | — | — |
| 3 | Same as Comparative Example 1 (m/n = 1/1, $\eta_{inh}$ = 0.59) | 10 g None | 320° C. 1 hr | — | Dissolved* | 195 | 780 |
| 4 |  2.5 g ("Udel polysulfone p-1700" manufactured by Union Carbide Co.) | Novolak type epoxy resin 0.25 g | 280° C. 2 hr | 200 | Dissolved | — | — |
| 5 | Same as Comparative Example 4 | Isocyanurate derivative of tolylene di-isocyanate 0.39 g | 280° C. 2 hr | 200 | Dissolved | — | — |
| 6 | Same as Comparative Example 4 | Hexamethoxy-methyl-melamine 0.25 g | 260° C. 3 hr | 200 | Dissolved | — | — |
| 7 | Same as Comparative Example 4 | Cu(acac)₂ 0.025 g | 240°0 C. 3 hr | 200 | Dissolved | — | — |
| 8 | Same as Comparative Example 4 | FeCl₃ 0.025 g | 240° C. 5 hr | 200 | Dissolved | — | — |

*Degree of swelling (%) in NMP

TABLE 9

| Comparative Example | Copolymer or polymer | Compound of (a) to (d) | Curing condition | Th (°C.) | Degree of swelling (%) in m-cresol | Flexural strength (kg/cm²) | Impact strength (kg·cm/cm) |
|---|---|---|---|---|---|---|---|
| 9 | 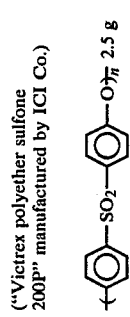 2.5 g ("Victrex polyether sulfone 200P" manufactured by ICI Co.) | Novolak type epoxy resin 0.25 g | 280° C. 2 hr | 220 | Dissolved | — | — |
| 10 | 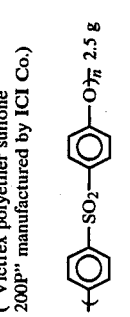 2.5 g ("Victrex polyether sulfone 200P" manufactured by ICI Co.) | Isocyanurate derivative of tolylene diisocyanate 0.39 g | 280° C. 1 hr | 220 | Dissolved | — | — |
| 11 | 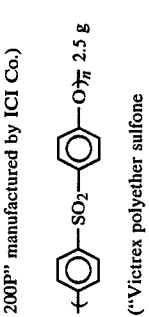 2.5 g ("Victrex polyether sulfone 200P" manufactured by ICI Co.) | Hexamethoxymethylmelamine 0.25 g | 260° C. 3 hr | 220 | Dissolved | — | — |
| 12 | 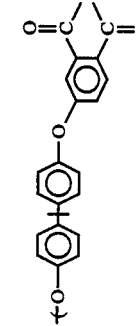 2.5 g ("Victrex polyether sulfone 200P" manufactured by ICI Co.) | $FeCl_3$ 0.025 g | 240° C. 5 hr | 220 | Dissolved | — | — |
| 13 | 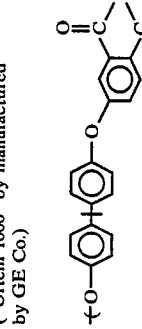 2.5 g ("Ultem 1000" by manufactured by GE Co.) | Hexamethoxymethylmelamine 0.25 g | 260° C. 3 hr | 220 | Dissolved | — | — |
| 14 |  2.5 g ("Ultem 1000" by manufactured by GE Co.) | Cu(acac)₂ 0.025 g | 240° C. 3 hr | 220 | Dissolved | — | — |
| 15 | — | 4,4'-Bis-maleimide di- | 180° C. 1 hr | — | — | 240 | 0.6 |

TABLE 9-continued

| Comparative Example | Copolymer or polymer | Compound of (a) to (d) | Curing condition | Th (°C.) | Degree of swelling (%) in m-cresol | Flexural strength (kg/cm²) | Impact strength (kg · cm/cm) |
|---|---|---|---|---|---|---|---|
| | | phenylmethane* 10 g | +250° C. 10 hr (50 kg/cm² press) | | | | |

*Molded plate

The present invention provides a curing method in which an aromatic polysulfone/polythioether sulfone polymer or an aromatic polythioether sulfone homopolymer is mixed with a member selected from the group consisting of (a) to (d) as described in the foregoing, and the mixture is subjected to heat treatment. The invention provides an excellent effect that the heat resistance of the cured product obtained by this curing method is remarkably improved. Further, the cured product is excellent also in the solvent resistance and water resistance, and it is useful for a wide range of applications.

We claim:

1. A method for curing an aromatic polythioether sulfone, which comprises mixing an aromatic polythioether sulfone polymer with a member selected from the group consisting of (a) a compound having at least two 1,2-epoxy, isocyanate or maleimide groups per molecule, (b) an aminoplast resin, (c) a metal chelate compound of acetylacetone, and (d) a halide of a metal belonging to Group VIII or IB of the Periodic Table, followed by heat treatment.

2. The method according to claim 1, wherein the aromatic polythioether sulfone polymer is a polymer having the formula:

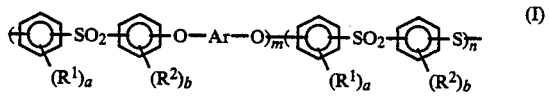

wherein Ar is a bivalent aromatic residue selected from the group consisting of:

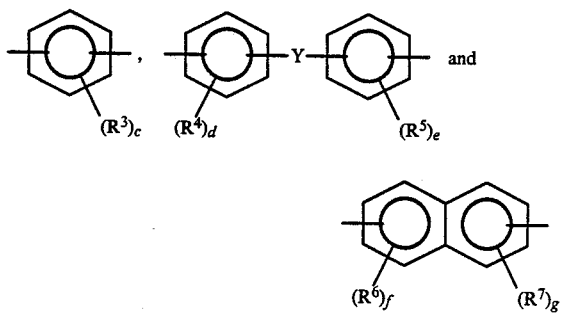

wherein each of $R^1$ to $R^7$ which may be the same or different, is hydrogen or a hydrocarbon group having from 1 to 8 carbon atoms, each of a to e which may be the same or different, is an integer of from 0 to 4, each of f and g which may be the same or different, is an integer of from 0 to 3, Y is a single bond, —O—, —S—, —SO$_2$—,

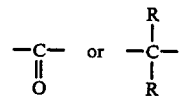

wherein R is hydrogen or a hydrocarbon group having from 1 to 6 carbon atoms, and each of m and n is an integer indicating the degree of polymerization, and m:n is from 1:20 to 20:1, provided that when m=0, the polymer is a polythioether sulfone homopolymer.

3. The method according to claim 1, wherein from 0.5 to 50 parts by weight of a compound having at least two 1,2-epoxy groups per molecule is mixed to 100 parts by weight of the aromatic polythioether sulfone polymer.

4. The method according to claim 1, wherein from 0.5 to 50 parts by weight of a compound having at least two isocyanate groups per molecule is mixed to 100 parts by weight of the aromatic polythioether sulfone polymer.

5. The method according to claim 1, wherein the aromatic polythioether sulfone polymer is mixed with a compound having at least two maleimide groups per molecule in a weight ratio of from 100:1 to 1:10.

6. The method according to claim 1, wherein from 0.5 to 50 parts be weight of an aminoplast resin is mixed to 100 parts by weight of the aromatic polythioether sulfone polymer.

7. The method according to claim 1, wherein from 0.1 to 20 parts by weight of a metal chelate compound of acetylacetone is mixed to 100 parts by weight of the aromatic polythioether sulfone polymer.

8. The method according to claim 1, wherein from 0.1 to 20 parts by weight of the halide of a metal belonging to group VIII or IB of the Periodic Table is mixed to 100 parts by weight of the aromatic polythioether sulfone polymer.

9. The method according to claim 1, wherein the heat treatment for curing is conducted at a temperature of from 150° to 400° C.

* * * * *